July 16, 1957     P. L. KNIGHT     2,799,288
GAS MIXING APPARATUS
Filed Dec. 20, 1954
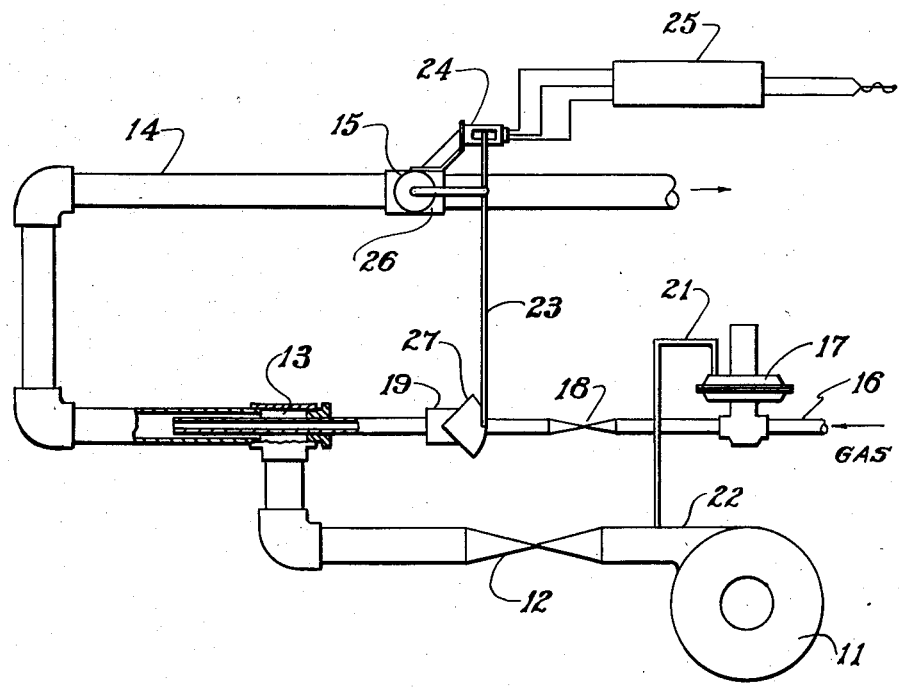
INVENTOR.
P. L. KNIGHT
BY
Charles S. Haughey
ATTORNEY United States Patent Office 2,799,288
Patented July 16, 1957

2,799,288
GAS MIXING APPARATUS

Philip L. Knight, Toledo, Ohio, assignor to Surface Combustion Corporation, Toledo, Ohio, a corporation of Ohio Application December 20, 1954, Serial No. 476,265

8 Claims. (Cl. 137—98)

This invention relates to gas mixing apparatus of the type having orifices in the respective air and gas lines in which substantially equal gas and air differential pressures over these orifices are maintained to obtain proportioning of the gas and the fuel.

It is known that orifices, and venturis (which are a special class of orifice) have characteristic flow rates roughly proportional to differential pressures therethrough for a given gas and venturi size and design. These characteristics are extremely difficult to actually duplicate in a given size, or to match for proportioning, and in practice it has been found impractical to maintain large turndown with such mixing apparatus. This invention provides the means for solving the problem of extending the turndown range of a mixing apparatus incorporating gas and air orifices which are used to proportion the flow of gas and air.

For a consideration of what I believe to be novel and my invention, attention is directed to the following portion of the specification and the drawing and the claims thereof.

The drawing shows a schematic diagram of apparatus according to the present invention.

In the apparatus illustrated, air is supplied at a substantially constant pressure by a blower 11 to an air pipe 22 and is passed through a venturi 12 which is a primary, fixed restrictor and therethrough to a mixing T 13. Fuel gas is supplied through a gas main 16 and a regulator 17 which is back loaded by a pipe 21 to the air pipe 22 in such a manner such as to produce substantially constant gas pressure which may be equal to or a slight variance to the air pressure. The gas then passes through pipe 16 to a gas venturi 18 which also is a primary, fixed restrictor, through a variable orifice valve 19, and to mixing T 13. The gas mixture passes from the T 13 through a pipe 14 and mixture flow valve 15 and thence to burners, not shown, for consumption. A temperature control device 25, ordinarily responsive to a thermocouple in a furnace, controls a servo-motor 24 to operate a push rod 23. The mixture flow valve 15 is operated from the push rod by a linkage 26. Push rod 23 also operates a cam member 27 in the valve 19 so that as the push rod 23 moves the valve 19 is also moved.

The valve 19 which is a secondary adjustable restrictor is a relatively common type which may be characterized in such a manner as to make the degree of opening of the valve directly related to but not proportioned to the travel of the push rod 23 or degree the valve stem is turned. This is ordinarily done by a set of adjusting screws which are adjusted to change the shape of a valve operating cam on the under side of the member 27. Such a valve is illustrated in a Patent to F. T. Cope, Number 2,341,177.

In the original setting up of the apparatus illustrated, the burners will ordinarily be set to fire at a maximum rate and the gas and air venturis will be selected to produce a substantially perfect air-gas mixture. The burners will then be reduced in firing rate by steps and at each step the valve 19 will be adjusted in a manner to change the characteristics of the gas venturi 18 by increasing or decreasing resistance to gas flow sufficient to maintain the air-gas ratio substantially constant. After this has once been done over the full operating range of the apparatus, then for every position of the gas mixture valve, which corresponds to a rate of flow of mixture to the burner, there is a corresponding position and adjustment of the variable orifice valve 19 which will correct the characteristics of the gas venturi 18 in a manner to produce with the air venturi 12 a constant air gas ratio.

If it is desired to operate this apparatus as a mixing station to produce a constant pressure mixture for supplying fuel to a multiplicity of furnace zones, the temperature controller instrument 25 may be replaced by an instrument responsive to gas pressure downstream of the valve 15 and will thus open and close the valve 15 in a manner to maintain a constant pressure downstream thereof.

It will be appreciated that the valve 19 may be upstream or downstream at the gas venturi 18, or a larger size valve equivalent to the valve 19 might be placed in the air pipe 22, so that the air venturi characterization would be adjusted instead of the gas venturi.

I claim:

1. Fluid mixing apparatus comprising: a plurality of fluid conduits delivering into a common fluid mixture conduit; a mixture flow control valve in the mixture conduit; a primary, fixed restrictor in each of said fluid conduits which restricts flow therein and maintain an approximately constant ratio of flows through said conduits for various rates of total flow; a secondary, adjustable restrictor in each said fluid conduits except one; means for controlling the relative fluid supply pressures to said fluid supply conduits; and means linking said mixture flow control valve to said secondary, adjustable restrictors to actuate them in fixed relation whereby at any opening of said valve the ratio of flows through the conduits containing the primary restrictors is maintained substantially constant.

2. Fluid mixing apparatus for supplying a combustible mixture of fuel and air to burners, comprising: an air conduit and a fuel conduit supplying, respectively, air and fuel to a mixture conduit which in turn is adapted to supply combustible fuel and air mixture to the burners; a primary, fixed restrictor in the fuel conduit and the air conduit which restrict flow in their respective conduits and are sized to maintain a predetermined, approximately constant ratio of flow of the air and gas; a secondary, adjustable restrictor in one of the fuel and air conduits for adjusting the pressure drop across the primary, fixed restrictor therein; means for supplying air to the air conduit; means for supplying fuel to the fuel conduit; means for controlling the fuel pressure entering the fuel conduit in a fixed relation to the pressure of air entering the air conduit; and means for adjusting said secondary, adjustable restrictor in fixed relation to the flow of fluid through said mixture conduit to maintain a constant ratio of flow in said air and fuel conduits for any given amount of total flow.

3. Fluid mixing apparatus for supplying a combustible mixture of fuel and air to burners, comprising: an air conduit and a fuel conduit supplying, respectively, air and fuel to a mixture conduit which in turn is adapted to supply combustible fuel and air mixture to the burners; a first primary, fixed restrictor in the fuel conduit; a second primary, fixed restrictor in the air conduit, said restrictors restricting flows in the conduits to maintain their ratio approximately constant for varying rates of total flow; a secondary, adjustable restrictor in one of said fuel and air conduits for increasing or decreasing resistance in said conduit and thereby changing the flow therein; blower means for supplying air at a substantially constant pressure to the air conduit; means comprising a fuel pressure regulator for supplying fuel to the fuel conduit at a substantially constant pressure substantially equal to the pressure of air supplied to the air conduit; a mixture flow control valve in the mixture conduit; and connection means for adjusting the secondary, adjustable restrictor responsive to the position of the mixture flow control valve to maintain constant ratio of flow in the air and fuel conduits.

4. Apparatus according to claim 3 wherein said primary, fixed restrictors are venturi shaped.

5. Fluid mixing apparatus for supplying a combustible mixture of fuel and air to burners, comprising; an air conduit and a fuel conduit supplying, respectively, air and fuel to a mixture conduit which in turn is adapted to supply combustible fuel and air mixture to said burners; a primary, fixed restrictor in each of the fuel and air conduits to maintain an approximately constant ratio of flow of fuel and air to said mixture conduit at various rates of total flow; a secondary, pre-adjusted, adjustable restrictor in one of the air and gas conduits for changing the resistance in that conduit to maintain a constant ratio of flow of fuel and air to said mixture conduit at varying rates of flow; means for supplying air at a substantially constant pressure to the air conduit; means for supplying fuel to the fuel conduit at a substantially constant pressure substantially equal to the pressure of the air supplied to the air conduit; a mixture flow control valve in the mixing conduit; and connection means for adjusting the secondary adjustable restrictor responsive to the position of the mixture flow control valve.

6. Apparatus according to claim 5 in which the secondary, adjustable restrictor comprises a pre-adjusted adjustable-aperture valve in which the aperture area is disproportional to the degree the valve stem is turned.

7. Fluid mixing apparatus for supplying a combustible mixture of fuel and air to burners, comprising: an air conduit and a fuel conduit supplying, respectively, air and fuel to a mixture conduit which in turn is adapted to supply combustible fuel and air mixture to said burners; a mixture flow control valve in the mixture conduit; a primary, fixed restrictor in each of the fuel and air conduits to maintain approximately proportional resistances and flows in said conduits at various rates of total flow; a secondary, adjustable restrictor in one of the air and gas conduits which is pre-adjusted in fixed relation to the position of said mixture control valve in a manner to maintain the total resistance in that conduit proportional to the resistance in the conduit containing no secondary restrictor, at various rates of flow; means for supplying air at a substantially constant pressure to the air conduit; and means for supplying fuel to the fuel conduit at a substantially constant pressure substantially equal to the pressure of the air supplied to the air conduit.

8. Fluid mixing apparatus for supplying a combustible mixture of fuel and air to burners, comprising: an air conduit and a fuel conduit supplying, respectively, air and fuel to a mixture conduit which in turn is adapted to supply combustible fuel and air mixture to said burners; a mixture flow control valve in the mixture conduit to adjust the total flow of the mixture resulting from the mixing of the air and gas from their respective conduits; a primary, fixed restrictor in each of the fuel and air conduits to main approximately proportional resistances and flows in said conduits at various rates of total flow, said restrictors imparting substantially greater resistance to flow in the conduits than the conduits themselves do, whereby the resistances to flow created by said restrictors are substantially the only resistances in said conduits, and said restrictors having such shapes that their resistances to the flows in said conduits will remain approximately the same for any rates of flow; a secondary, adjustable restrictor in one of the air and gas conduits which is pre-adjusted in fixed relation to the position of said mixture control valve in a manner tending to maintain the total resistance in that conduit proportional to the resistance in the conduit containing no secondary restrictor, for various rates of flow, whereby the ratios of the rates of flow will be constant for varying rates of total flow; means for supplying air at a substantially constant pressure to the air conduit; and means for supplying fuel to the fuel conduit at a substantially constant pressure substantially equal to the pressure of the air supplied to the air conduit.

References Cited in the file of this patent

UNITED STATES PATENTS

| | | |
|---|---|---|
| 1,290,513 | Collins et al. | Jan. 7, 1919 |
| 2,536,678 | Coe | Jan. 2, 1951 |
| 2,675,820 | Harrison | Apr. 20, 1954 |